United States Patent [19]

Burton et al.

[11] 4,331,983

[45] May 25, 1982

[54] FACSIMILE SIGNALLING METHOD

[75] Inventors: Jack D. Burton, Orlando; Stephen D. Fisher, Altamonte Springs, both of Fla.

[73] Assignee: Exxon Research & Engineering Co., Florham Park, N.J.

[21] Appl. No.: 120,487

[22] Filed: Feb. 11, 1980

[51] Int. Cl.$^3$ ............................................... H04N 1/32
[52] U.S. Cl. .................................... 358/257; 358/267; 358/280
[58] Field of Search ............... 358/257, 267, 256, 280, 358/264

[56] References Cited

U.S. PATENT DOCUMENTS

| | | | |
|---|---|---|---|
| 3,889,057 | 7/1975 | Perreault et al. | 359/257 |
| 4,153,916 | 5/1979 | Miwa et al. | 359/257 |

*Primary Examiner*—Robert L. Richardson
*Assistant Examiner*—Edward L. Coles

*Attorney, Agent, or Firm*—Dale Heist; Norman L. Norris

[57] ABSTRACT

A method for use in a facsimile system wherein a calling party unit has the capability of either transmitting a message to a called party unit or alternatively of directing an unattended called party unit to transmit a message to the calling party. The method allows the calling party to direct the called party unit to transmit rather than to receive. A communication link is first established between the calling party and the called party. Next, at least one of the plurality of the incoming information signals directed from the called party are detected by the calling party. In response, the calling party dispatches an outgoing master/slave indicator in the interval between incoming identification signals. In one embodiment an outgoing equipment identification signal is also dispatched in the intervals between the incoming identification signals and the steps of dispatching the master/slave indicator signal and dispatching the outgoing identification signals are repeated until a command signal is received.

11 Claims, 6 Drawing Figures

FACSIMILE SIGNALLING METHOD

BACKGROUND OF THE INVENTION

This invention relates in general to facsimile systems and, in particular, it relates to a signalling method for use in such systems whereby one machine may direct an unattended remote machine to transmit documents to a near side machine.

In facsimile systems, in the most common mode of operation, a calling party's unit transmits documents to the called party's unit. However, it is also desirable to provide a feature whereby the calling party's unit may direct an unattended called party's unit to transmit a document or documents from it to the calling party's unit. This capability is especially desirable in units having automatic paper feed, since in these machines documents may be loaded into a paper tray, and the unit may then be left unattended. Thereafter, a caller may contact the unattended unit and direct it to transmit the waiting documents.

In one such known prior art unit, a signalling method is employed which allows for the aforementioned capability. In this prior art method, before a handshake has been exchanged between the respective machines, the calling party's unit directs a continuous tone which, when received by the called party, indicates to it that it is to respond by transmitting documents rather than by receiving them.

This prior art signalling method suffers from a number of disadvantages. First, recommended signalling procedures have been proposed by the CCITT and these procedures are increasingly being used as international signalling standards for facsimile systems. The use of a continuous tone, such as that employed by the known prior art, is incompatible with these standards. It would be desirable to provide a signalling method for directing a remote facsimile unit to transmit documents rather than to receive them which would not be incompatible with the recommendations of the CCITT.

Another disadvantage of the prior art technique of using a continuous tone is that during the period in which the continuous tone is directed from the calling party to the called party, no other information between the units may be exchanged. It would be desirable to provide a signalling method which would increase the amount of information transmitted in any given time so as to make full use of relatively expensive long distance telephone time. In accordance wwith the present invention, a signalling method is provided whereby a calling party may direct a remote, unattended unit to transmit a document or documents to it without the above noted disadvantages.

SUMMARY OF THE INVENTION

In its broadest form, the present method comprises the establishment of a communication link between the calling party and the called party. After this link has been established, the called party transmits a plurality of identification signals spaced apart by a predetermined interval as determined by the CCITT recommendations. These identification signals inform the calling party as to the type of equipment at the remote location. For example identification signals inform the calling party as to whether the called party can transmit or receive in 2 or 3 minute mode or a 4 or 6 minute mode or both. These equipment identification signals are detected by the calling party on receipt, and, when detected, at least one master/slave indicator signal along with an outgoing identification signal is dispatched by the calling party to the called party in the intervals between the detected incoming identification signals. The called party ceases its transmission of identification signals and sends a command signal upon receipt of the master/slave indicator signal and outgoing identification signal. The calling party ceases transmission of master/slave indicator signal and outgoing identification signal when the command signal is received from the called party.

The foregoing method is not incompatible with the recommendations of the CCITT since it is operator selectable. Moreover, during the period that the master/slave indicator signal is being transmitted to the called party indicating to it that it is to transmit and not to receive, identification signals from the called party to the calling party informing the calling party as to various aspects of the remote machine may be transmitted.

In a preferred embodiment of the present invention, master/slave indicator signal may comprise one of a number of frequencies transmitted during the intervals between incoming identification signals from the called party. The selected one of these frequencies indicates to the called party the mode of transmission desired. Thus, during the period in which the called party is being directed to transmit, it is also receiving other information from the calling party.

BRIEF DESCRIPTION OF THE DRAWINGS

The present invention will be more fully understood by reference to the accompanying drawings in which.

DETAILED DESCRIPTION OF THE PREFERRED EMBODIMENT

Figure 1:
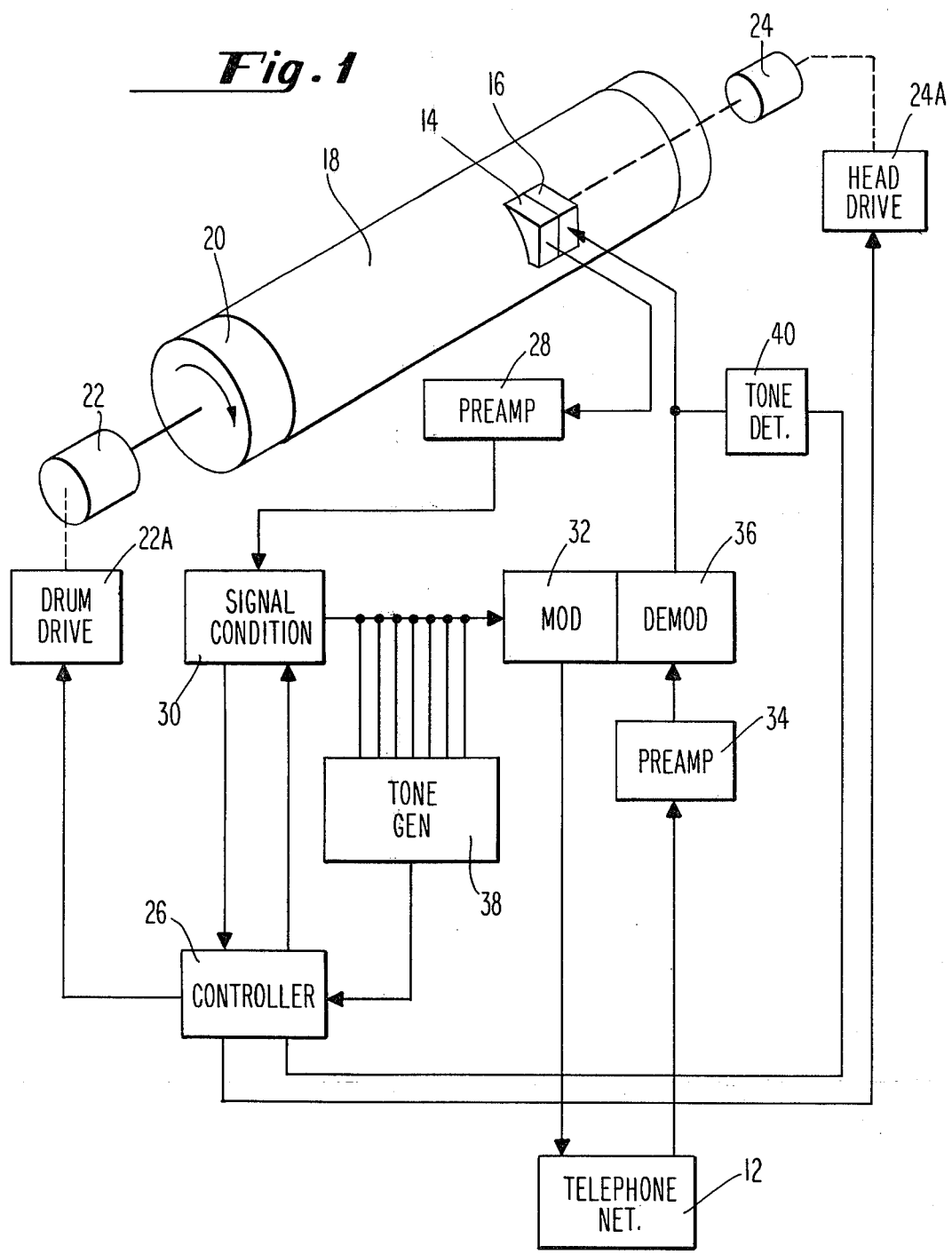
FIG. 1 is a block diagram of a facsimile system of the type with which the present method finds utility.

Referring to FIG. 1, a facsimile transceiver 10 is shown. The transceiver 10 is connected through the telephone network 12 to another transceiver [not shown]. Each transceiver 10 comprises a reading means 14 and a writing means 16 which scan a document 18. The document may be positioned upon a revolving drum 20. The drum 20 is driven by drum drive motor 22 controlled by drum drive circuit 22A. The document 18 can be positioned upon drum 20 and rotated past the reading means 14 and the writing means 16. The reading means 14 and the writing means 16 are also advanced along the axis of the drum 20 by the head drive motor 24 controlled by head drive circuit 24A. Both the drum drive circuit 22A and the head drive circuit 24A are controlled by microprocessor controller 26.

When the transceiver 10 is in a transmit mode, video signals corresponding to light/dark variations on the document 18 are detected by the reading means 14. The video signals are directed to a pre-amp 28, where they are amplified. The amplified signals are then directed to signal conditioning circuit 30 and then modulated by a modulator 32 for transmission to the remote transceiver [not shown] through the telephone network 12.

When the transceiver 10 is in a receive mode, incoming video facsimile signals from the telephone network 12 are first amplified by pre-amp 34. These incoming amplified signals are demodulated by demodulator 36 and the demodulated signals are directed to writing means 16 where the signals are converted to light/dark variations on the paper 18 positioned on rotating drum 20.

However, before the transceiver 10 can transmit video signals to a remote machine or receive video signals therefrom, various control information must be exchanged. Accordingly, each transceiver 10 includes a tone generator 38 and a tone detector 40, each under the command of the controller 26.

Figure 2:
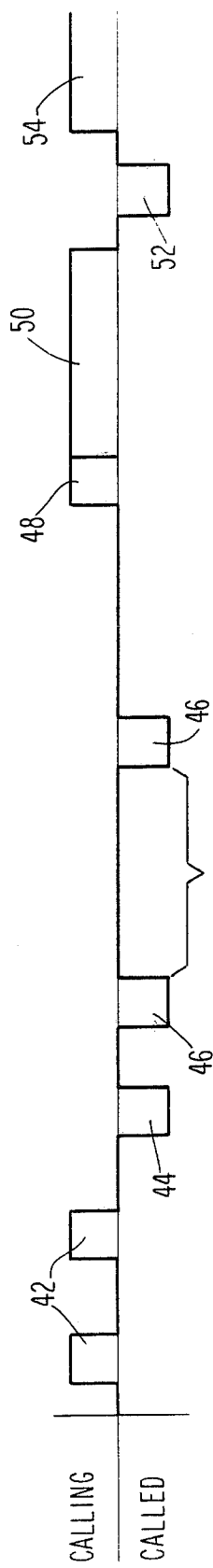
FIG. 2 is a timing diagram showing a method in which various signals from a calling party to a called party are transmitted prior to a transmission from the calling party to the called party.

Referring to FIG. 2, some of the various tones generated by the tone generator 38 and detected by the tone detector 49 are shown. The tones shown in FIG. 2 are those recommended by the CCITT for use when a calling party desires to transmit a message to a called party unit.

As seen in FIG. 2, one or more ring signals 42 are directed to the called party each lasting approximately 0.5 second. Upon receipt of the ring signals 42, the called party responds with a response signal 44 and with a plurality of identification signals 46 which are subsequently detected by the calling party. The response signal 44 is a 2100 Hz. signal which indicates to the calling party that the ring signals 42 have been detected, the phone answered and a facsimile machine present. Each of the identification signals 46 are either a 1650 Hz. or 1850 Hz. or both signal, spaced apart by the predetermined interval y. The CCITT recommends this interval be three second (plus or minus fifteen percent), and in the preferred embodiment the interval is 3 seconds minus 15% or 2.6 seconds. These identification signals 46 indicate to the calling party the equipment type at the remote location. For example, a 1650 Hz. information signal 46 may indicate that the remote transceiver 10 may operate in only a four or six minute mode. These incoming identification signals 46 are detected by the tone detector 40 and communicated to the controller 26.

The controller 26, in response to an incoming detected identification signal 46 causes the tone generator 38 to emit command signal 48. Command signal 48 is preferably a 2100 Hz. signal which indicates to the called party which mode the called party has selected for transmission, i.e., 2, 3, or 4, 6 minute transmission. The calling party next dispatches a phasing signal 50 which is used to bring the rotating drums 20 of each transceiver 10 into phase with one another.

When the drums 20 are in phase, the called party emits a 1650 Hz. confirmatory signal 52 indicating that the remote transceiver 10 is ready to receive. When the confirmatory signal 50 is detected by the calling party a video signal 54 is transmitted.

Figure 3:
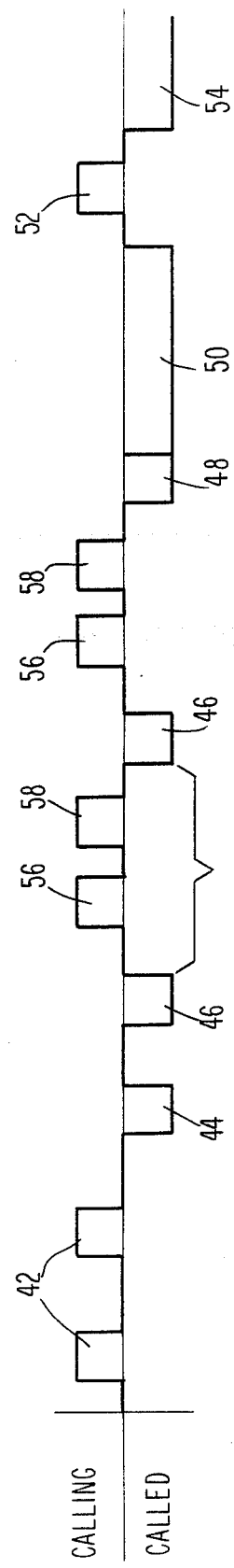
FIG. 3 is a timing diagram showing a method in which various signals are transmitted from a calling party to a called party when the calling party directs the called party to transmit rather than to receive.

Referring now to FIG. 3, one embodiment of a method of directing a remote transceiver 10 to transmit rather than to receive video information will be described. First, a communication link is established between the calling party and the called party. This is accomplished by the emission of one or more ring signals 42 and by the receipt of a response signal 44. Response signal 44 is followed by at least one incoming identification signal 46 which is detected by the calling party. However, instead of responding with a command signal 48, the calling party dispatches an ongoing master/slave indicator signal 56 and an outgoing identification signal 58 in the predetermined interval y, between the last received incoming identification signal 46 and the next expected incoming identification signal 46. Master/slave indicator signal 56 is one of four frequencies which indicate the desired speed of transmission selected. In the preferred embodiment, the master/slave indicator signal may be either a 1350, 1410, 1740 or 2000 Hz. signal which indicates a command to transmit in either a 6, 4, 3, or 2 minute mode respectively. Therefore the receipt of the master/slave indicator signal 56 by the called party indicates to it that it is expected to transmit rather than to receive video information at the speed indicated by the frequency of the tone. Because the master/slave indicator signal may vary in frequency, a remote party may be directed to transmit at different speeds unlike the prior art wherein the remote party is directed to transmit at only one speed. Also, because the master/slave indicator signal 56 is transmitted in the interval between the incoming identification signals 46, the method of the present invention is not incompatible with the recommendations of the CCITT, unlike the prior art technique wherein a continuous tone is generated by the calling party, thus over-riding incoming identification signals. Also in the present method, during the period in which the master/slave indicator signal 56 is being transmitted, the calling party has had an opportunity to ascertain the equipment type of the remote party from the identification signals 46.

Moreover, in accordance with the preferred embodiment of the present invention outgoing identification signals 58 are also transmitted in the interval between the last detected incoming identification signal 46 and the next expected identification signal 46. In this matter, during the period in which the master/slave indicator signal 56 is being transmitted, the called party is also given the opportunity to ascertain the equipment type of the calling party. While outgoing identification signal 58 may alternatively be dispatched in the interval immediately following the interval in which the master/slave indicator signal was dispatched, in the preferred embodiment, outgoing identification signals 58 are dispatched in the same interval as master/slave indicator signal 56.

In the particularly preferred embodiment of the present invention, the dispatching of the master/slave indicator signals 56 and outgoing identification signals 58 is repeated until a command signal 48 is detected or a time out occurs. Each time an incoming identification signal 46 is detected, the calling party can presume that, the called party has not yet received the master/slave indicator signal 56. Accordingly, if an incoming identification signal 46 is detected, after a master/slave signal has been dispatched, the calling party emits another master/slave indicator signal 56 and another outgoing identification signal 58.

If neither a command signal 48 nor an incoming identification signal 46 are received within 2.6 sec. of the last detected incoming identification signal, the calling party again emits a master/slave identification signal 56 immediately followed by an outgoing identification signal 58. In this case, it is desirable to have the interval, between outgoing identification signals 58 differ from the interval, y, between incoming identification signals 46. In this manner, the likelihood that outgoing identifications signals 58 will coincide with incoming identification signals 46 is minimized.

Thus, when an incoming identification signal 46 is not detected within 3 seconds after the calling station is on line, the calling party emits outgoing identification signals 58 with intervals of silence 3 seconds+15% or 3.4 seconds between them. Since the CCITT recommends that identification signals have 3 seconds±15% of silence between them, this assures that incoming identification signals 46 and outgoing identification signals 58 are not superimposed such that neither party can detect the other.

Following receipt by the called party of the master/slave indicator signal 56 and outgoing identification signal 58, a command signal 48 and a phasing signal 50 are transmitted to the calling party. When these are detected by the calling party and after phasing has been accomplished a confirmatory signal 52 is dispatched indicating that the calling party is ready to receive transmitted video information 54.

Figure 4:
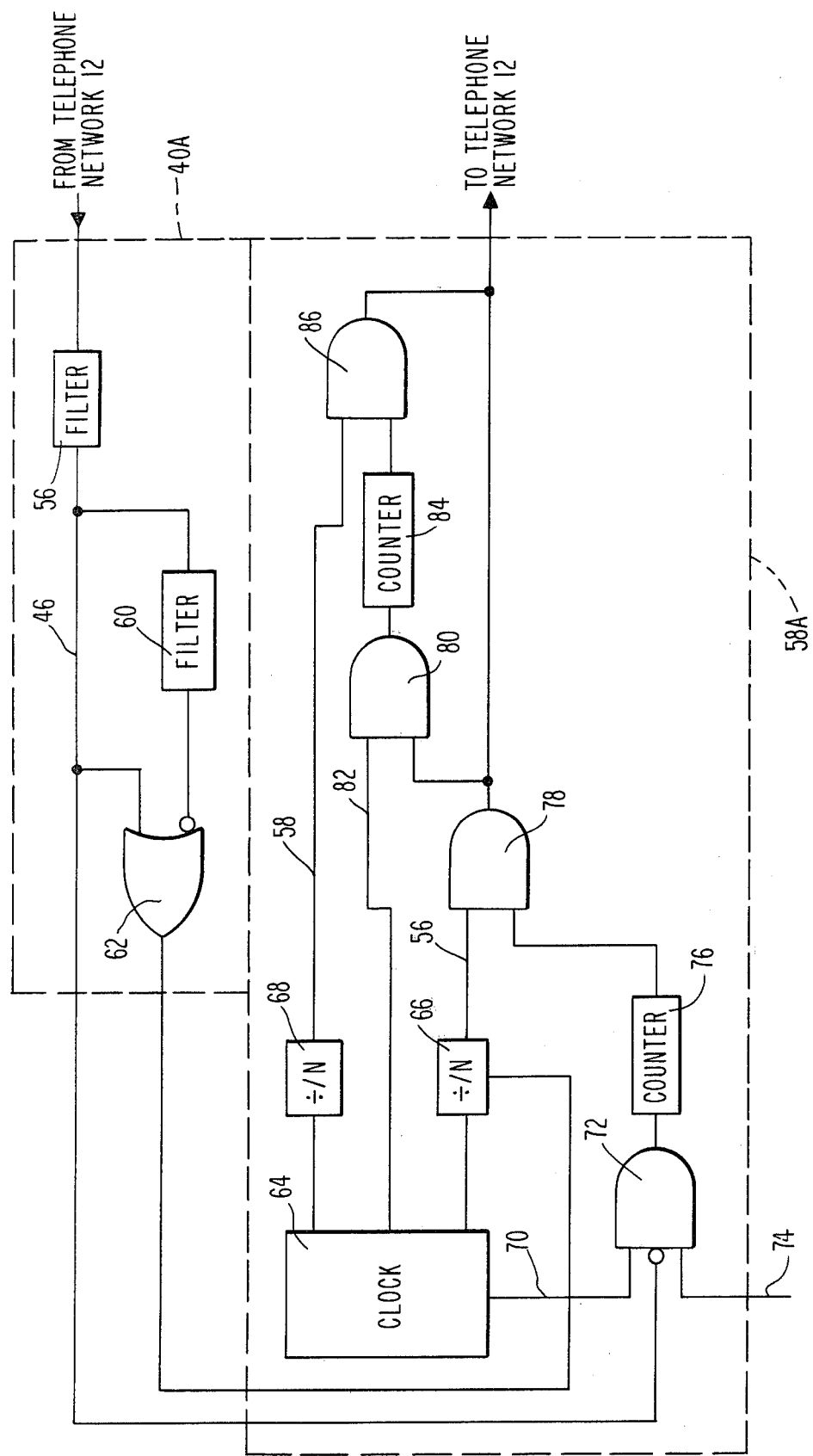
FIG. 4 is a schematic diagram of a portion of a tone generator and a portion of a tone detector for use in carrying out the method of the present invention.

Referring now to FIG. 4, a portion 38A of the tone generator 38 and a portion 40A of the tone detector 40 useful in the practice of the present method may be seen.

The portion 40A of the tone detector 40 shown in FIG. 4, comprises a filter to which incoming signals from the telephone network 12 are directed. The filter 56 is used to detect incoming identification signals 46. The portion 40A also comprises a filter 60 and OR gate 62, the function of which will be described below. The portion 38A of tone generator 38 which is shown in FIG. 4, comprises a crystal oscillator 64 as well as dividers 66 and 68. The frequency generated by oscillator 64 is divided by each of the dividers 66 and 68. The output of divider 66 is an oscillating signal having the selected frequency of master/slave indicator signal 56, while the output of divider 68 is an oscillating signal having a frequency of outgoing identification signal 58. The output of oscillator 64 is also directed along lead line 70 to gate 72. Gate 72 is opened to pass clock pulses 70 from the oscillator 64 whenever it is desired to indicate to a remote unit to transmit rather than to receive and after an incoming identification signal 46 has been received. Accordingly, whenever it is desired to enable gate 72 in order to indicate to a remote unit to transmit rather than to receive, a pulse is directed along lead line 74 from controller 26. Thereafter, whenever an incoming identification signal 46, as identified by filter 56, has been received, clock pulses through line 70 are gated through gate 72 to activate counter 76. The counter 76 then enables gate 78 for the period in which it is desired to transmit a master/slave indicator signal 56 to telephone network 12.

At the time master/slave indicator signal 56 passes gate 78, gate 80 is opened to pass clock pulses from lead line 82 to activate counter 84. The counter 84 thus enables gate 86 to transmit outgoing identification signals 58 to the telephone network 12.

During the period that incoming identification signals 46 are present, OR gate 62 applies a continuous reset to divider 66, thus inhibiting the generation of master/slave indicator signals 56 during this time.

However, when incoming identification signals 46 terminate, the divider 66 is enabled to allow transmission of master/slave indicator signals 56. When an incoming command signal 48 is detected by filter 60, the divider 66 is again disabled.

Figure 5A:
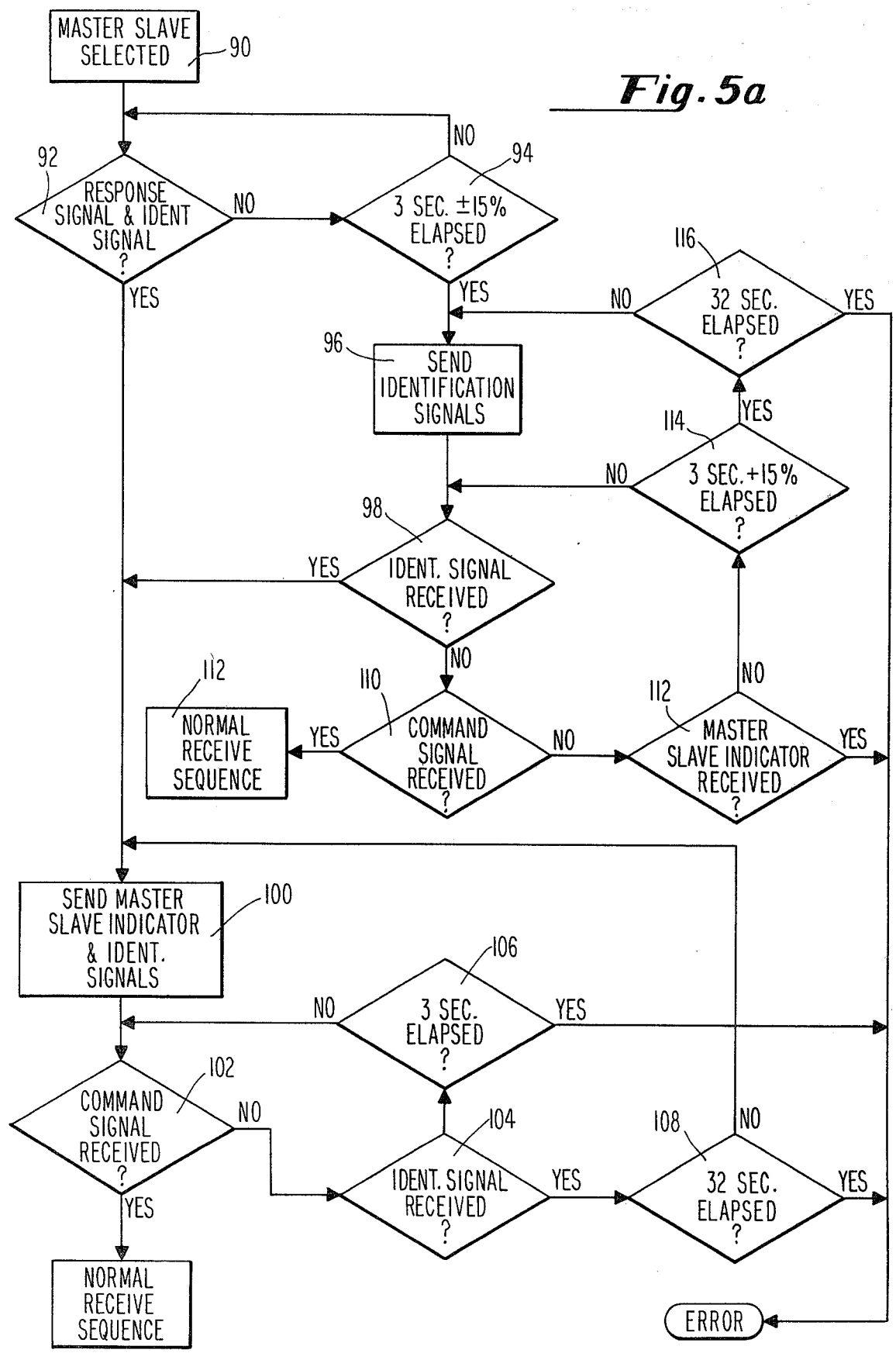
FIGS. 5a and 5b are flow charts illustrating the method of the present invention.
Figure 5B:
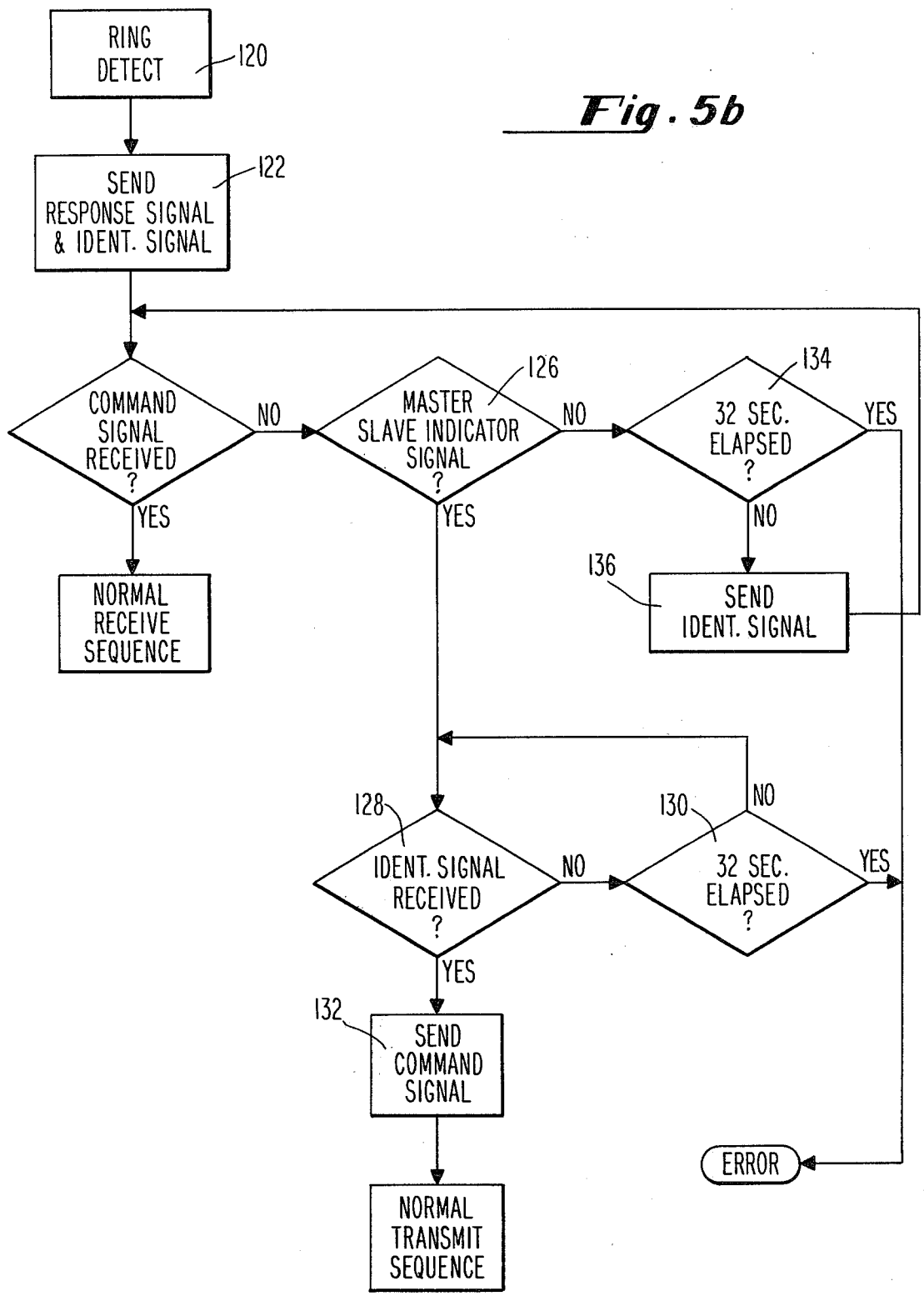

Referring now to FIGS. 5A and 5B, the preferred embodiment for the practice of the present method will be described. FIG. 5A comprises a flow chart disclosing the signal processing sequence employed by the calling party. Block 90 in FIG. 5A indicates that the calling party is operating in a master/slave mode, i.e., that the calling party desires to direct the called party to transmit rather than to receive a message. When operating in such a mode, the calling party's tone detector 40 monitors the telephone network 12 for incoming response signals 44 and identification signals 46 as shown in decision block 92. This monitoring continues for a period of 3 seconds±15% as shown in block 94. After 3 seconds±15% has elapsed, however, the calling party begins emitting outgoing identification signals 58 as shown in block 96, and again awaits receipt of an incoming identification signal 46 as shown in block 98. If an incoming identification signal 46 has been received, a master/slave indicator signal 56 and an outgoing identification signal 58 are transmitted as shown in block 100.

After master/slave indicator signal 56 and outgoing identification signal 58 have been transmitted, as shown in block 100, the calling party monitors for the presence of incoming command signals 58 indicating to it that its master/slave indicator signal has been received as shown in decision block 102. Upon receipt of this command signal, a normal receive sequence is undertaken by the calling party.

If the command signal 48 is not received by the calling party, tone detector 40 continues to monitor for incoming identification signals 46 as shown in decision block 104. If no identification signal is received, the calling party again looks for command signals 48 for a period of 3 seconds as shown by block 106. However, if an identification signal 46 is received, the calling party repeats its master/slave indicator and identification signals 56 and 58 unless 32 seconds have elapsed in which the call is terminated as shown in block 108.

When monitoring for incoming identification signals 46 as shown in decision block 98, if none are detected, the calling party monitors for incoming command signals 48 indicating that the called party has decided to transmit rather than to receive even before receiving the master/slave indicator signal 56, in which case the calling party undertakes a normal receive sequence as shown in blocks 110 and 112. However, if no command signal is received, the calling party insures that the called party is not also operating in a master/slave mode as shown by block 112. If the called party is not operating in such a mode, the calling party continues to monitor for incoming identification signals 46 for a period of 3 seconds as shown by block 114. However, if 3 seconds±15% has elapsed, and then if a full 32 second period for completion of signalling has not elapsed, as shown by block 116, another outgoing identification signal 53 is dispatched as shown by block 96.

Referring now to FIG. 5B, a flow chart depicting the signal processing steps employed by the called party is described. The called party monitors for ring signals 42 as shown by block 120, and when received dispatches a response signal 44 and an identification signal 46 as shown in block 122. The called party then monitors for the presence of a command signal 48 as shown in block 124. If a command signal 48 is received, the called party continues in its normal receive sequence, however, if a command signal 48 is not received, the called party monitors for the presence of a master/slave indicator signal 56 as shown in block 126. If a master/slave indicator signal 56 is received the called party then monitors for the presence of an outgoing identification signal 58 as shown in block 128. If an outgoing identification signal 58 is received within the 32 second period allotted for completion of all signalling as shown in block 130, the called party emits a command signal 48 as shown in block 132, in which case the normal transmit sequence is carried out.

If the called party does not receive either a command signal 48 or a master/slave indicator signal as shown by decision blocks 124 and 126, and if 32 seconds for signalling has not elapsed as shown in block 134, the called party emits another identification signal 46 as shown by block 136.

While the present invention has been described in connection with a calling party's direction of a remote called party to transmit rather than to receive a message those skilled in the art will recognize that the present invention has utility in any situation in which a first party seeks to direct a remote second party to transmit a document to the first party, regardless of which party originally placed the call. Therefore, the term "calling party" is used herein to describe whichever party desires to inform an unattended remote party to transmit regardless of which party placed the call. Moreover, while a particular embodiment has been shown and described, it will, of course, be understood that various modifications may be made without departing from the principles of the present invention. The appended claims, are therefore, intended to encompass any such modifications within the true spirit and scope of the invention.

What is claimed is:

1. In a facsimile system wherein the calling party unit has the capability of transmitting a message to a called party unit, or alternatively, of directing an unattended called party unit to transmit a message to the calling party unit, a method of directing said called party unit to transmit rather than to receive comprising:
   establishing a communication link between said calling party and said called party;
   detecting at least one of a plurality of incoming identification signals directed to said calling party from said called party, said incoming identification signals being spaced apart by a predetermined interval;
   dispatching an outgoing master/slave indicator signal from said calling party to said called party in the interval between the last detected incoming identification signal and the next expected incoming identification signal.

2. The method of claim 1 further comprising the step of:
   repeating said dispatching step until a command signal is detected by said calling party.

3. The method of claim 1 further comprising the step of:
   dispatching an outgoing identification signal with said master/slave indicator signal from said calling party to said called party in the interval between the last detected income identification signal and the next expected incoming identification signal.

4. The method of claim 3 further comprising the step of repeating both of said dispatching steps until a command signal is detected by said calling party.

5. The method of claim 4 wherein the interval between said outgoing identification signals slightly differs from said predetermined interval.

6. The method of claim 3 further comprising the step of:
   detecting an incoming group command signal and an incoming phasing signal to said calling party from said called party, said group command signal and said phasing signal being dispatched by said called party upon receipt thereby of said outgoing master/slave indicator signal and said outgoing identification signal.

7. The method of claim 6 further comprising the step of:
   dispatching an outgoing confirmatory signal from said calling party to said called party after phasing has been accomplished.

8. The method of claim 1 further comprising the step of:
   dispatching an outgoing identification signal from the calling party to the called party in the interval following the interval in which said master/slave indicator signal is dispatched.

9. The method of claim 8 wherein both of said dispatching steps are repeated until a command signal is detected by said calling party.

10. The method of claim 1 wherein said step of establishing a communication link comprises:
    dispatching an outgoing ring signal from said calling party to said called party; and
    detecting a reply signal from said called party to said calling party, said reply signal being generated in response to said ring signal.

11. The method of claim 1 wherein said master/slave indicator signal compasses a selected one of a plurality of frequencies each of which identifies a particular transmission speed.

* * * * *